(12) United States Patent
Rose

(10) Patent No.: US 6,531,063 B1
(45) Date of Patent: *Mar. 11, 2003

(54) ZEOLITE BED LEACH SEPTIC SYSTEM AND METHOD FOR WASTEWATER TREATMENT

(76) Inventor: Jane Anne Rose, 4 Turner La., Lancaster, MA (US) 01523

(*) Notice: Subject to any disclaimer, the term of this patent is extended or adjusted under 35 U.S.C. 154(b) by 0 days.

This patent is subject to a terminal disclaimer.

(21) Appl. No.: 09/565,893

(22) Filed: May 5, 2000

Related U.S. Application Data

(63) Continuation-in-part of application No. 09/013,614, filed on Jan. 26, 1998, now Pat. No. 6,080,314, which is a continuation-in-part of application No. 08/954,667, filed on Oct. 20, 1997, now Pat. No. 5,911,876, which is a continuation-in-part of application No. 08/593,883, filed on Jan. 30, 1996, now Pat. No. 5,679,256, which is a continuation of application No. 08/262,767, filed on Jun. 20, 1994, now abandoned.

(51) Int. Cl.$^7$ .................................................. C02F 9/00
(52) U.S. Cl. ................. 210/631; 210/662; 210/670; 210/747; 210/96.1; 210/170; 210/266; 210/269; 210/284; 210/290; 210/903
(58) Field of Search ................. 210/631, 670, 210/681, 747, 170, 265, 266, 269, 532.2, 903, 93, 96.1, 662, 143, 180, 182, 202, 284, 290

(56) References Cited

U.S. PATENT DOCUMENTS

| | | | | |
|---|---|---|---|---|
| 3,723,308 A | * | 3/1973 | Breck | 210/681 |
| 4,184,947 A | * | 1/1980 | Demisch | 210/631 |
| 4,219,441 A | * | 8/1980 | Noshimura et al. | 210/673 |
| 4,321,141 A | * | 3/1982 | Messing | 210/615 |
| 5,185,080 A | * | 2/1993 | Boyle | 210/747 |
| 5,198,113 A | * | 3/1993 | Daniels | 210/170 |
| 6,080,314 A | * | 6/2000 | Rose | 210/170 |

OTHER PUBLICATIONS

Neel, Daphne, et al., "Sorption of Organics to Surface–Altered Zeolites"; *Agencies and Science Working for the Future, New Mexico Water Resources Research Institute*, Nov. 1991, pp. 57–61, Department of Geoscience, New Mexico Tech, Socorro, New Mexico.

* cited by examiner

*Primary Examiner*—Ivars Cintins

(57) ABSTRACT

A septic system and method for the removal of nitrogen contaminants, such as nitrates and ammonia, from a wastewater effluent. The system comprises one or more zeolite tanks which contain a regenerable, granulated zeolite material to receive wastewater effluent from a septic tank and to capture the nitrogen contaminants to provide a treated, decontaminated effluent to flow out of the tank into a leach field. The system includes a secondary treatment tank to reduce suspended solids and the biological oxygen demand (BOD) of the wastewater effluent prior to introduction into the zeolite tank. The system also includes an ion sensor to monitor the ammonium ion concentration in the system and to signal the need to regenerate the zeolite tank with saline water.

51 Claims, 3 Drawing Sheets

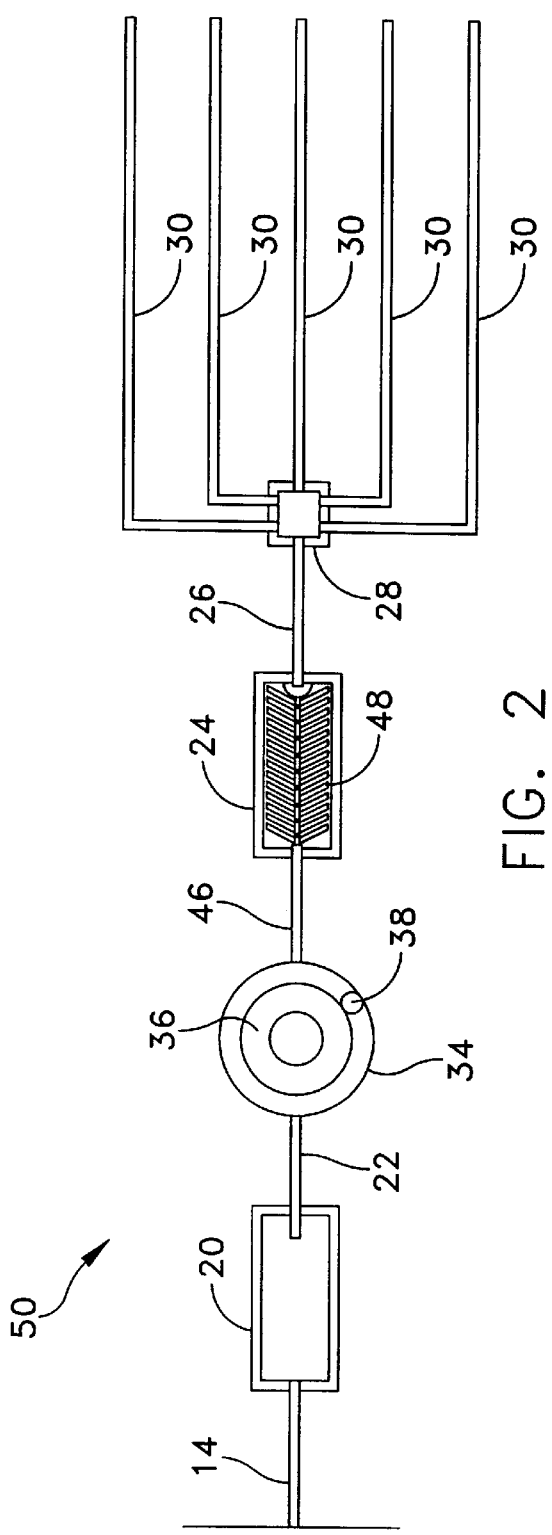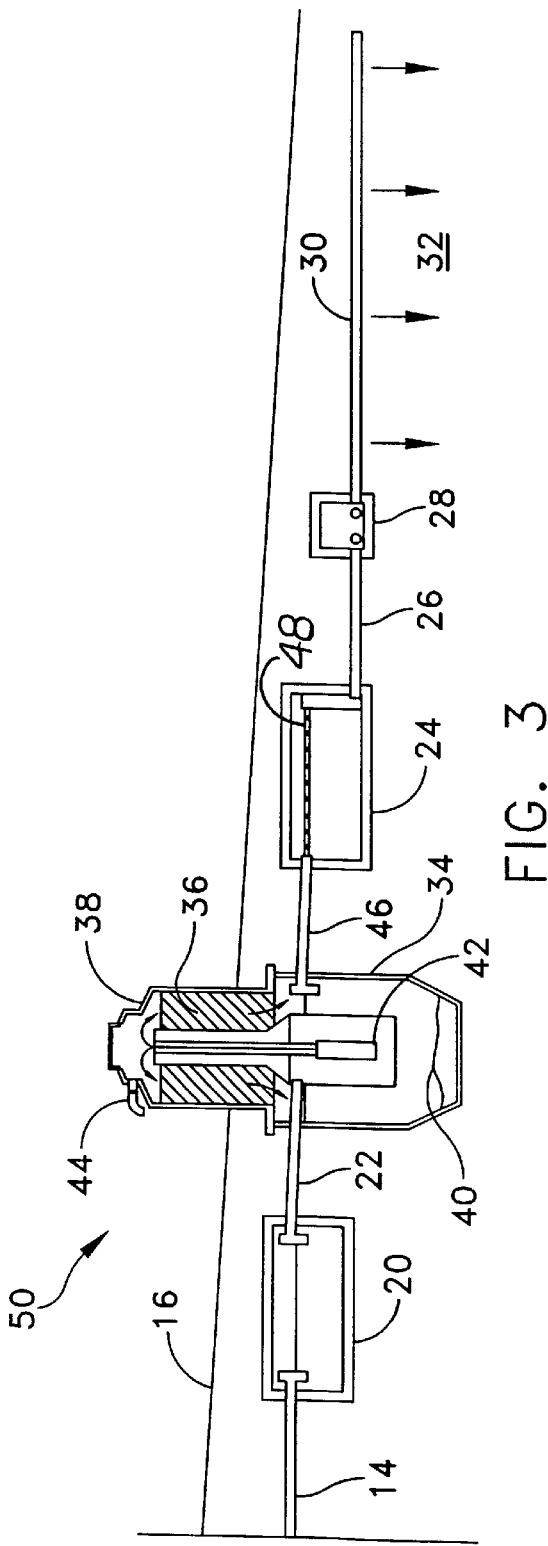

US 6,531,063 B1

ZEOLITE BED LEACH SEPTIC SYSTEM AND METHOD FOR WASTEWATER TREATMENT

REFERENCE TO PRIOR APPLICATIONS

This application is a continuation-in-part of U.S. patent application Ser. No. 09/013,614, filed Jan. 26, 1998, now U.S. Pat. No. 6,080,314, which is a continuation-in-part application of U.S. patent application Ser. No. 08/954,667, filed Oct. 20, 1997, which is now U.S. Pat. No. 5,911,876, issued Jun. 15, 1999, which application is a continuation-in-part of U.S. patent application Ser. No. 08/593,883, filed Jan. 30, 1996, now U.S. Pat. No. 5,679,256, issued Oct. 21, 1997, which application is a continuation of U.S. patent application Ser. No. 08/262,767, filed Jun. 20, 1994, now abandoned.

BACKGROUND OF THE INVENTION

The parent application is hereby incorporated by reference in its entirety and is directed to a method and system for the in situ removal of radionuclides from a groundwater radionuclide contaminated water source, such as a moving, underground water plume. The parent application provides for a trench or a bed above groundwater level and containing therein, granulated zeolite material, and with the trench having a bottom water barrier lining.

Groundwater containing the radionuclides is distributed, such as by pumping from a water source, generally uniformly, over the top of the zeolite material in the trench, in order to filter the radionuclide contaminated water source through the zeolite bed to remove the radionuclides, or rather metal contaminants, cations, i.e., using the zeolite material, such as by ion exchange with the zeolite material, or more typically by capture of the radionuclides or other contaminates in the internal lattice structure of the zeolite material. The system and method also provides for the discharge of the treated water from the bottom of the trench containing the zeolite material, or recycling all or part of the treated water, as desired, back to the trench for continuous treatment, until the desired level of treatment water is obtained. The system and method also includes for the in situ closure of the trench with the zeolite material, by covering the trench of the zeolite material, for example, with a plastic or clay layer, and subsequently burying the trench with soil to close the bed after the exhaustion of the process by the zeolite material, thereby providing for the in situ treatment and removal of radionuclides or other contaminants from the contaminated water source.

Septic systems are commonly used for the treatment of domestic wastewater, and such septic systems include a septic tank to receive a flowing wastewater effluent or sewerage, typically, from a residence or small business, and which effluent sewerage includes solid matter, and wherein the septic tank bacteria breaks down the sewerage and solid matter. The septic system normally includes one or more leaching fields to receive the continuously flowing treated effluent or "grey water" from the septic tank. Generally, the septic systems are employed in those suburban or farm areas where there is a lack of a central or municipal sewerage facility. Approximately ⅓ of all households in the United States dispose of domestic wastewater through the use of septic tank systems. However, due to poor construction and maintenance or geologic conditions, septic tank systems have polluted underlying ground waters and surface waters, such as streams, rivers, ponds, estuaries and bays.

While septic systems with the septic tank and leach field are acceptable, septic system problems are magnified by the fact that in many areas, particularly rural communities, a substantial reliance on subsurface sewage disposal systems is paralleled by a reliance on private wells for drinking water supplies. These problems, which stem from the nutrient-rich composition of the septic tank effluent water when it reaches the leach field, create hazardous conditions in certain areas. For example, where soils are sandy and well-drained, and on-site groundwater is also a source of drinking water for the domicile, nutrient-rich water from leachate can contaminate the drinking water source. Nutrient-rich leachate from home septic systems can cause unacceptably high nitrate levels in drinking water, resulting in "blue baby" syndrome and other health problems. Nitrogen is a key nutrient of concern, because it contributes to the eutrophication of surface water, as well as posing health hazards in groundwater. Nitrates in drinking water, derived from wells where septic system are also present on-site, constitute a widespread, intractable problem throughout the United States. It is therefore desirable to provide for a new and improved septic system and method for the treatment of wastewater effluent and sewerage.

SUMMARY OF THE INVENTION

The invention relates to a zeolite-augmented bed septic system and method for the treatment of wastewater, particularly through the use of zeolite material in an adjunct tank between the septic tank and the leaching field.

In particular, the invention concerns a zeolite bed septic system and method which includes a filter media bed between the septic tank and the zeolite bed; and optionally, an ion sensor monitoring system and method for ammonium ions and a regeneration system.

The invention relates to a septic system for the removal of contaminants, particularly nitrogen contaminants, such as ammonia from wastewater effluent, which septic system comprises a source of wastewater containing nitrogen and other contaminants, such as ammonia and phosphorus, and typically a residence or small business employing such a septic system, and more particularly, wherein the septic system is located in a very low-soil absorbing geographical area, such as Cape Cod. The system includes a septic tank connected to said wastewater source to receive septage, including solid matter, and the septic tank containing bacteria therein for the treatment of said septage and to provide a wastewater treated effluent from said septic tank. The system also includes a zeolite-filled tank (or bed) in the ground, above groundwater, to receive the wastewater effluent from the septic tank and one or more leaching fields. The second tank contains granulated zeolite material selected to capture and retain the nitrogen and other nutrients and contaminants in the wastewater effluent from the septic tank. Inflow to the zeolite tank is composed of nutrient-rich wastewater effluent from the septic tank. Outflow from the tank is effluent that has been filtered by the zeolite in the tank and no longer contains nutrient contaminants. Outflow from the tank is piped to a standard leach field where it will leach into the groundwater. A septic system also includes a means to regenerate periodically, as desired, the zeolite material in the zeolite tank when the zeolite material can no longer substantially capture the nitrogen contaminants from the treated wastewater effluent, and includes a means to remove the displaced nitrogen contaminants generated from the regeneration of the zeolite material.

Generally, the septic tank and the zeolite tank are employed as an underground septic system, above groundwater level, in a well-drained, typically sandy soil, and wherein the nitrogen contaminant in the wastewater effluent comprises primarily nitrates and ammonia, and wherein the zeolite material comprises a granulated, natural zeolite material, placed in one or more concrete tanks, preceding the leach field trench or bed. The zeolite material in the tank may be regenerated in a number of ways; for example, by the use of liquid solution with cations or other compounds to displace the nitrogen contaminants, such as ammonia, captured within the zeolite material; the means are provided to remove the released nitrogen contaminants, such as by the employment of a pump means to pump out the septic tank or leaching field, or a heating means to heat the zeolite material to displace the nitrogen contaminants, such as ammonia, as a gas and either to permit the escape of the gas or to capture the gas. The zeolite material in the zeolite tank field may also be regenerated by nitrifying bacteria introduced into the zeolite material, which may be included as nonpathogenic organisms within the zeolite material.

The zeolite tank may be equipped with shut-off valves at the intake and outflow, and piped openings on top of the tank, through which a flushing hose may be introduced to flush the zeolite with regenerating fluid, which is then extracted. The extracted regenerating fluid then contains the nitrogen contaminants previously stored in the zeolites, and the zeolites are recharged and ready to receive and decontaminate effluent from the septic tank.

The invention also comprises a method for the removal of nitrogen contaminants, more particularly ammonia, from wastewater effluent from a septic system, and which method would comprise introducing a wastewater effluent from a septic system and containing nitrogen contaminants, such as ammonia, into one or more zeolite-filled tanks, and which one of the zeolite tanks would comprise regenerable particulate zeolite material selected to capture, and retain therein the nitrogen contaminants in the wastewater effluent from the septic system. The method would include periodically regenerating the zeolite material after the zeolite material has been substantially exhausted, by capturing the nitrogen contaminants, by treating the zeolite material, such as by, but not limited to heating liquid solutions, flushing with saline water, bacteria, or other means to otherwise remove or displace the captured nitrogen contaminants from the zeolite material in the zeolite tank, to restore the zeolite material in the zeolite tank for reuse. The method would include removing the displaced nitrogen contaminant material by separately treating the escaped contaminant material, or permitting the material to be discharged into the atmosphere, or otherwise treating or removing the displaced nitrogen material from the zeolite tank contained in the septic system.

One embodiment of the zeolite septic system and method may be called the Cape Cod disposal system. This embodiment consists of an underground tank filled with zeolite material, installed at a residence or small business as an adjunct to a septic tank, to be an adjunct to the typical septic tanks and leach field commonly used in a home septic system. The zeolite material in the tank removes ammonia and other contaminants received from the septic tank wastewater. Ammonia in wastewater is a major problem on Cape Cod, and similar soil areas (e.g., Long Island, N.Y.) that generally resisted installing municipal sewers in favor of individual septic systems. The septic systems (mainly the leach fields) cause nitrogen loading in the rivers, ponds, groundwater, and coastal areas, leading to algal blooms and eutrophication of water bodies. One way to remedy the situation would be to construct wastewater treatment plants, connect homes to public sewer, treat the waste in the treatment plant and pump the effluent out to the ocean. The Cape Cod disposal system is a much less expensive way to remedy the problem, and does not contribute to, and in fact prevents, ocean eutrophication.

An ordinary leach field or soil absorption system is constructed in coarse-grained sandy soil of varying mineral composition. Water must be able to percolate through the soil quickly in order for a site to be approved by regulating agencies for leach field construction. Wastewater enters a leach field by way of a distribution box and piping from the septic tank. The immediate source of the wastewater is a septic tank, into which all of the bath, kitchen, and laundry wastes from a home are piped. The solids settle to the bottom of the septic tank, and the liquid wastewater effluent flows out of the tank and into the leach field through a pipe exiting near the top of the tank. The wastewater is distributed by a distribution box and gallery piping along the top of the one or more leaching beds.

Rather than the discharge of the treated wastewater effluent derived from a septic tank or cesspool into a leach field, it is recognized that said effluent may be discharged in a receptor tank or tank trench for removal or other treatment prior to discharge into the soil or discharged at a remote location or treatment facility, rather than to a leach field.

Regulations and construction restrictions are imposed by governmental agencies to assure that the leach field will function properly. The soil must be well drained. Bedrock and stony areas are prohibited as building sites, as are steep slopes and unstable areas. Disturbed ground may not be used, nor may low lying areas near coastal areas or surface waters. Leach fields are always constructed in the unsaturated zone, well above groundwater, and as far as possible from wells and water supplies.

Geologically, Cape Cod is a glacial outwash plain composed of clean quartz sands (the sands have actually been very well washed by the glacial meltwater). The groundwater under the sands is a sole source aquifer, which has been granted special protection status, because it is the only source of fresh water on Cape Cod. All of the surface water bodies on the Cape are directly connected to this aquifer. Cape Cod is a nitrogen-sensitive area. One cause of nitrogen sensitivity on Cape Cod is the difference in soil mineralogy between Cape Cod, with its stable quartz sands, and continental areas which contain soils of varying compositions, charges, and grain sizes. Clays are typical constituents of continental soils, and clays generally have good absorptive properties. Cations, like nitrogen, are attracted to the charged region between the clay layers and are held between the layers by ionic bonds. Other types of silicate minerals typical of continental areas have varying absorptive properties, depending on their crystal structure, ionic charge, and composition.

On the opposite end of the soil spectrum are Cape Cod sands, which are non-absorptive, mono-mineralic quartz grains with a framework crystal structure that has no charge, and no spaces in the framework where cations can enter. On Cape Cod, there is nowhere for the nitrogen from the leach fields to go, but into the aquifer and surface waters, because the quartz sands will not absorb it. This in turn creates algal blooms, weed-choked ponds and low oxygen conditions in the water, unfavorable for fish and shellfish. Percolation ("perc") tests are required prior to leach field construction to ensure that the soil will drain well enough for a septic system to function. On Cape Cod, the soils are too well-drained for an ordinary septic system to function properly, allowing contaminated water to leach into the aquifer.

The Cape Cod septic zeolite waste disposal system and method, when used with an ordinary, functional septic tank, will remove nitrogen and other unwanted constituents from wastewater, and hold them within the tank until they are removed by reactivation of the zeolite. Reactivation of the zeolite material in the zeolite tank would be part of the normal maintenance of the septic system. The size of the zeolite tank could be adjusted to allow for reactivation of the zeolite tank to coincide with septic tank pumping.

The size of the Cape Cod leach field may be calculated, for example, on a "gallons per day" basis. A two bedroom home is required by state regulations in Massachusetts to provide a septic system able to handle 220 gallons of wastewater per day, while a 10 bedroom bed-and-breakfast must handle a minimum of 1000 gallons per day. A generous estimate for the amount of granulated, natural, zeolite material required for a zeolite tank for the bed-and-breakfast would be ½ ton, which would occupy 15 cubic feet of space. The cost of crushed and screened clinoptilolite, one example of a zeolite capable of removing 99% of nitrogen from septic waste material effluent, is reported to be between $200 to $300 a ton.

Zeolites have been used as a treatment for wastewater in municipal wastewater treatment plants and combined sewer overflows in some U.S. cities and Japan. Clinoptilolite has been the zeolite of choice, but experiments show that phillipsite, mordenite and erionite also work well. Natural zeolites are much less expensive than synthetic zeolites, though synthetic zeolites would also work well in the Cape Cod disposal system. In a demonstration project of an exchange-filtration system for wastewater treatment using natural clinoptilolite, conducted by the EPA in Syracuse, N.Y., ammonia in wastewater effluent was reduced to 0.02 mg/l. Significant reductions in bacteria, oxygen-demanding constituents, and other pollutants were realized as well.

Breakthrough exchange capacity occurs when the zeolite material can no longer absorb ammonia. Each type of zeolite has an associated exchange capacity, which determines when the Cape Cod disposal system requires regeneration. Once regenerated, the zeolite tank will continue to remove pollutants from wastewater. Several means of regeneration are available, including chemical, thermal and biological. Chemical methods employ a liquid solution containing a cation that enters the zeolite molecule, displacing the ammonia, which is then carried off in solution and may be used as fertilizer. Calcium and sodium are suitable cations. A simple regenerating liquid is sodium chloride (NaCl) in the same concentration as seawater.

Thermal regeneration is also very effective for complete regeneration of the zeolite material. Heating coils in the zeolite tank that could heat the spent zeolite up to 500 degrees celsius would produce a system that could be regenerated by a switch that controls the heating coils. A gas trap could be used to capture the nitrogen that off gases.

Biological regeneration by nitrifying bacteria would occur over time if the tank were aerated. Static ammonia exchange tests indicate that clinoptilolite will regenerate 80% of its ability to remove ammonia in 30 to 40 days, using only the naturally occurring nitrifiers. When the system is spiked with additional nitrifying bacteria, the regeneration time is halved. Since regular maintenance of septic systems is required by state law, regeneration of the zeolites in the Cape Cod waste disposal system should be performed by technicians coincident with tank pumping to ensure compliance and proper function.

In a further embodiment, the zeolite septic system and method include a media bed and/or secondary treatment tank to treat the wastewater effluent from the septic tank, to reduce suspended solids and biological oxygen demand (BOD) for the wastewater effluent treated in the septic tank or bed. The media bed comprises filter material, typically, randomly-dispersed, particulate material of porcelain; plastic; foam; or other inert filter material to lower the suspended solids in the wastewater effluent to a selected lower suspended solid particle concentration, for example, less than an average of about 50 ppm, i.e., less than about 15 to 20 ppm, and typically, to an average particle size of less than about 10 microns. The reduction of suspended solids and bacteria in the wastewater effluent to the zeolite tank reduces the tendency of the zeolite tank to clog in use.

Therefore, in one.embodiment, the media bed and secondary treatment tank comprise a pump chamber that connects the septic tank and the zeolite tank, which pump chamber would precede the zeolite tank. The pump chamber contains inlet and outlet pipes; a dosing pump; and a media bed or tank above the pump chamber that contains filter media, such as STYROFOAM® or pieces of plastic over which the septic tank effluent is pumped and filtered. Preferably, the pump chamber is oxygenated by means of a fan open to the outside. Septic tank wastewater effluent passes through the inlet pipe into the lower part of the pump chamber. When the water reaches the height of the pump, it is pumped over the media in the top of the pump chamber. After it has trickled through the media, it flows into the outlet pipe and into the zeolite bed, in a clarified state, with lower suspended solids and biological oxygen demand (BOD), thereby helping to prevent clogging in the zeolite tank. Optionally, the tank containing the pump chamber has an alarm that alerts the user if the pump fails to turn on at the appropriate time, while an optional second pump may be employed to insure the system works continuously.

Also, it has been discovered that an advantage may be gained by placing the outlet pipe of the zeolite tank at the base of the tank, rather than level with the inlet pipe. The clarified septic tank effluent from the pump chamber would then come into closer contact with the zeolite material and would not tend to remain in pore spaces between the zeolite grains. In this embodiment, the septic system effluent may be distributed over the zeolite in the tank through a distribution system that might spray the effluent evenly over the zeolite grains or allow it to trickle evenly through the bed of zeolite. Vents or air spaces above and below the zeolite tank allow the ion exchange process to occur in an oxygenated environment.

The zeolite bed may be composed of multiple layers of different zeolite material or particle size. For example, the lowermost layer of zeolite in the bed may contain approximately 70 to 75 percent of the total volume and of about 20×50 mesh or lower in grain size. The top layer of zeolite may contain 25 to 30 percent of the total volume of zeolite and is composed of a coarser grain size, for example, about 14×16 mesh or higher. The difference in zeolite particle or grain size allows the septic tank effluent to pond slightly over the finer grained zeolite material.

Optionally, the zeolite septic system and method may include an ion or other sensor system to monitor the ammonium content of the decontaminated water from the zeolite tank or the ammonia saturation of the zeolite material, so that automatic or manual regeneration of the zeolite material or other action taken will maintain the efficiency of nitrogen contaminant removal. The monitor and control system comprises an ion sensor to monitor and measure, generally by electrical conductivity, the saturated ammonium ion or ammonia concentration and suitable valves, pipes, and pumps.

In another embodiment, the system includes a source of backflush fluid, typically saltwater, with associated piping and pump to backwash periodically the zeolite bed, when the ion sensor detects that the zeolite bed requires regeneration, or at periodic time internals, where no ion sensor is necessary. The system may provide automatic backwashing at selected, detected ion sensor levels, generally, with the backwash water directed back into the backwater source tank.

An ion sensor is placed into the zeolite tank to recognize the state of ammonia saturation in the zeolite, and generally, the ion sensor would be placed near the outlet pipe. When the ammonium ion in the effluent reaches a selected concentration, for example, a concentration of 5 to 10 ppm or in regeneration, an alarm would alert the user that system maintenance, by backwashing the zeolite, is required. The ion sensor may also automatically trigger a backwash cycle to begin. In this embodiment, an additional tank of saltwater, or other ionic or regeneration material situated next to the zeolite tank, flushes the zeolite tank to carry out the ion exchange or regeneration process. Valves on the inlet and outlet pipes automatically direct the flow from the backwash tank to the zeolite tank. The ion sensor detects when backwashing is complete, which automatically ends the backwash cycle, and directs the backwash water into the backwash tank.

The invention will be described for the purpose of illustration only in connection with certain illustrated embodiments; however, it is recognized that various changes, modifications, additions and improvements may be made by those persons skilled in the art to the septic system, zeolite tank, and leach field method and system of the invention, as described and disclosed, without departing from the scope of the invention.

BRIEF DESCRIPTION OF THE DRAWINGS

FIG. 2 is a schematic, illustrative, top plan view of another embodiment of the invention employing a media bed and secondary treatment.

FIG. 3 is a side sectional view of the embodiment of FIG. 2.

DESCRIPTION OF THE EMBODIMENTS

Figure 1:
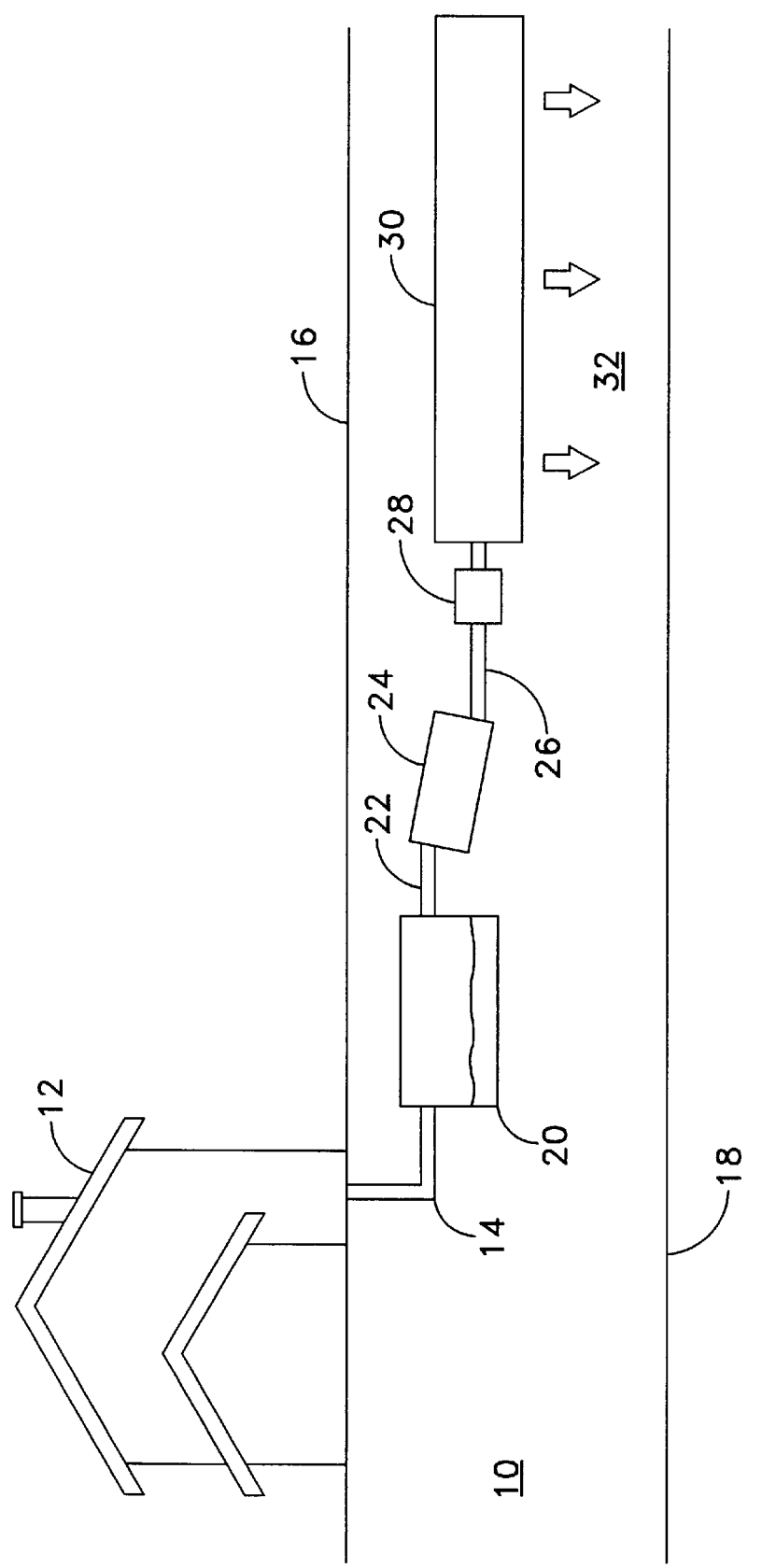
FIG. 1 is a schematic illustrative view of the zeolite material septic system and method of the invention for the treatment of wastewater from a septic tank.

FIG. 1 illustrates a zeolite septic tank system 10 comprising a residence 12, a source of residential waste sewerage which is transmitted through sewer pipe 14, beneath ground level 16, with the groundwater level 18 below a septic tank 20, into which the waste sewerage is deposited for bacterial decomposition of the solid material.

A sewer pipe 22 at or near the top of the septic tank 20 transmits liquid effluent through a zeolite tank 24 containing therein regenerable, synthetic or natural granulated zeolite material to capture the nitrogen contaminants, particularly nitrates and ammonia therein, which zeolite-filled tank may be angled slightly to allow the effluent water to flow through the zeolite by means of gravity. The decontaminated effluent flows, via pipe 26, through distribution box 28 to one or more leach fields, with lone leach field 30 illustrated. The treated effluent, reduced in nitrogen contaminants, percolates into the underlying soil of the leach field 32, as illustrated by the flow arrow.

With reference to FIGS. 2 and 3, there is illustrated a system and method 50, which represents an improvement of the system of FIG. 1. The system 50 includes a secondary treatment tank 34 connected by line 22 from the septic tank 20 and line 46 to the zeolite material tank 24, which includes a plurality of pipes or plates 48 to distribute clarified wastewater effluent from the secondary tank 34 over the top of a two-layer zeolite material in the tank 24. The outlet 26 from the zeolite material tank 24 is located near the bottom of the tank 24, while the inlet 46 is located toward the top for distribution purposes (FIG. 3).

The treatment tank 34 provides filtration and oxidation of solid suspended particles in the wastewater effluent from the septic tank output line 22. The tank 34 includes: a top media bed 36 containing particulate material; an outlet port 38 for the periodic removal of sludge from the sludge sump 40 in the bottom of the tank 34; and a dosing pump 42 to pump and recycle the wastewater effluent from the tank 34 upward and over the media bed 36 (see flow arrows in FIG. 3), while an intake fan 44 provides air for oxidation of the effluent in the media bed 36.

Figure 4:
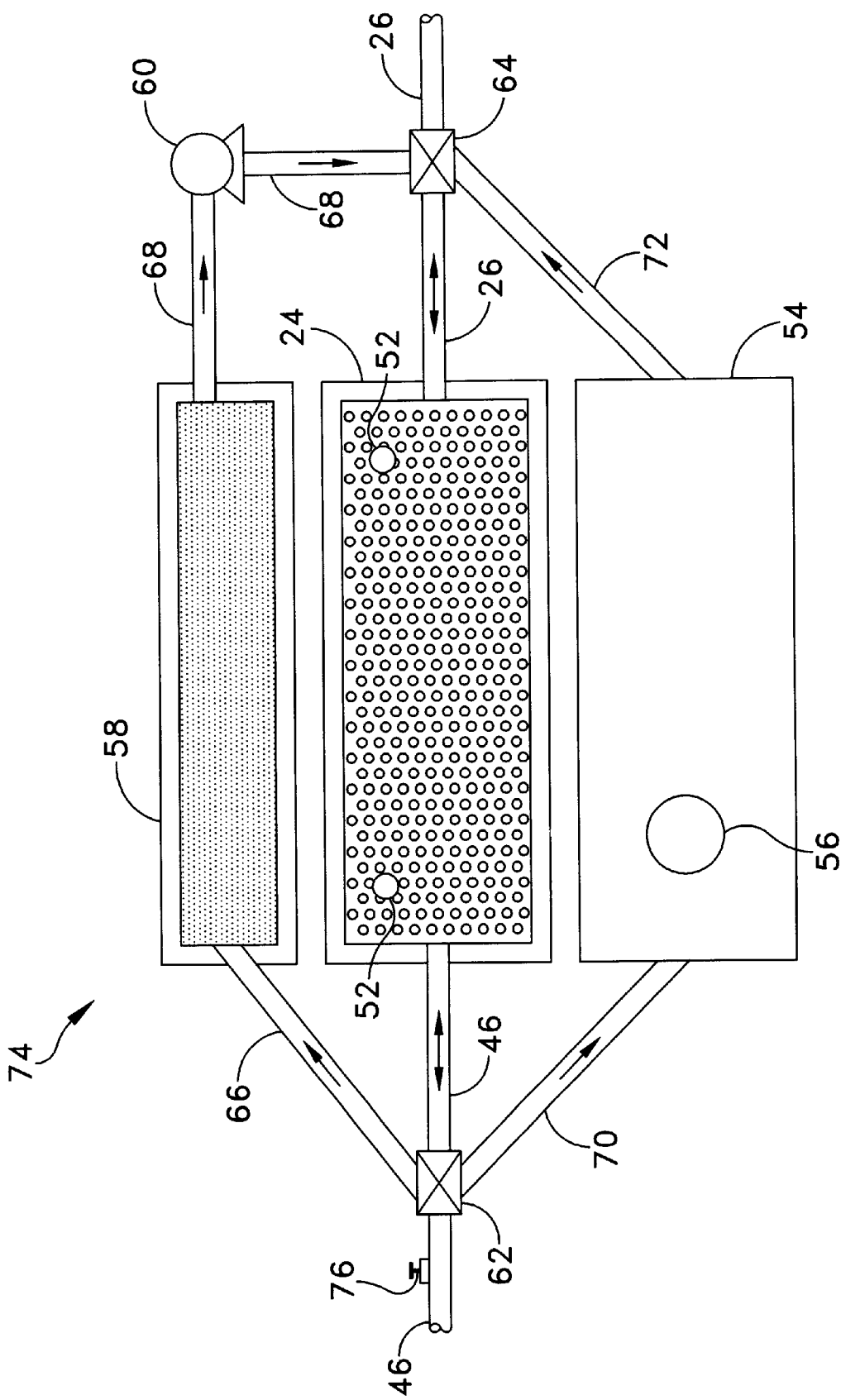
FIG. 4 is a schematic, enlarged, fragmentary illustration of a further embodiment illustrating a sensor monitor and zeolite regeneration, backwash cycle system.

FIG. 4 is another embodiment of the system and method of FIGS. 1, 2, and 3, which comprises a zeolite regeneration, backwash system and method. The backwash system 74 may be manual or automatic and may be employed with or without the use of a media bed 36 and secondary treatment tank 34. The system comprises an ion sensor 52 to detect the concentration of ammonia saturation, by measurement of the ammonium ion concentration level, generally through measurement of the electrical conductivity of the waste effluent at the inlet, outlet, or both the inlet and outlet of the zeolite bed 34.

The system 74 comprises a tank 58 containing rock salt or another ionic salt or mixture, a wastewater tank 54 to receive and retain wastewater with a cleanout manhole cover 56. The system includes various conduits 66, 68, 70, and 72 with multiple port valves 62 and 64 and a pump 60. Where an automatic system is desired, the valves 62 and 64 may be solenoid-operated valves, which receive electrical signals from the ion sensors 52, and from a control means to control the opening and closing of the valves 62 and 64 and operation of the pump 60, so that regeneration of the zeolite bed 24 automatically takes place when the ammonium ion level reaches selected concentrations. This system 74 illustrated employs inexpensive rock salt for regeneration; however, the controlled system may be used with other forms of regeneration.

In operation of system 74, the ion sensor 52 at the outlet 26 of the zeolite tank 24 detects the concentration of ammonium in the treated waste effluent in outlet 26. When the ammonium concentration reaches about 9 to 10 ppm, the ion sensor sends a signal (alarm, if manual) to start a backwash regeneration cycle. The signal closes valve 62 to divert the waste effluent in outlet 46, to conduit 66, and into the rock salt bed 58, to convert the grey water or waste effluent from the secondary treatment tank 34 or from the septic tank 20 into a saline grey water suitable for backwashing the zeolite material in the zeolite bed 24. The saline grey water, by pump 60, continually recirculates through conduit 68 and outlet 26 into the zeolite bed 24.

A second ion sensor 52, at the outlet 46, senses when the ammonium ion concentration is sufficiently low and that is when the backwash cycle is completed. Valve 62 is then activated by the ion sensor 52 signal to divert the saline backwash water by outlet 46 and conduit 70, into wastewater tank 54, and any overflow from conduits 72 and 68 back into the rock salt tank 58. Optionally, a flow meter and alarm 76 may be used to monitor waste flow to determine when regeneration should occur.

On completion of the backwash regeneration, the valves 62 and 64 return to normal flow position, wherein waste effluent is directed through inlet 46 into and through outlet 26 out of the zeolite bed 24. The saline backwash wastewater, highly concentrated in ammonium, in the wastewater tank 54 is then emptied or otherwise removed or treated by septic maintenance personnel as a part of the regular system upkeep.

In an automated system, the ion sensor 52, the valves, and the pumps would be integrated into a control system with suitable alarms, a computer, computer software, monitor displays, and data input and storage, and operated by signals derived from the sensors, so that regeneration-backwash would occur automatically when the zeolite material is saturated.

While the valves illustrated are multiport valves, it is recognized that a plurality of separate valves, manually or automatically controlled, may be used, as desired. Further, while a sensor system has been illustrated employing an ion sensor, it is recognized that other sensor or monitoring devices to monitor ammonia or other components or conditions may be employed alone or in combination. Also, rather than employ a sensor system, it is recognized that the system may be operated on a backwash cycle, based on selected time periods or flow rates through the zeolite bed, employing a flow meter and/or a timer mechanism, and optionally, with an alarm.

What is claimed is:

1. A septic system for the removal of nitrogen contaminants from septic wastewater effluent, which system comprises:
   a) a source of wastewater containing nitrogen contaminants;
   b) a septic tank- connected to said source of wastewater to receive such .wastewater and to provide a wastewater effluent from said septic tank;
   c) a secondary treatment means to receive the wastewater effluent, to reduce suspended solids in the wastewater effluent and to lower biological oxygen demand (BOD) and discharge a clarified wastewater;
   d) a zeolite tank means to receive the clarified wastewater and the tank means containing zeolite material selected to capture and.retain the nitrogen contaminants in the clarified wastewater and to provide a decontaminated wastewater effluent;
   e) a leach field means to receive the decontaminated wastewater effluent from the zeolite tank means; and
   f) a means to regenerate periodically, the zeolite material in the zeolite tank means, when the zeolite material can no longer substantially capture and retain the nitrogen contaminants.

2. The system of claim 1 wherein the septic system is an underground septic system in nonabsorptive, monomineralic quartz sand soil.

3. The system of claim 1 wherein the nitrogen contaminants comprise primarily nitrates and ammonia.

4. The system of claim 1 wherein the zeolite material comprises granulated natural zeolite material.

5. The system of claim 1 wherein the zeolite material is selected from the group consisting of:
   clinoptilolite; phillipsite; mordenite; erionite; and combinations thereof.

6. The system of claim 1 which includes a pump means, connected to the zeolite tank means to pump out the nitrogen contaminants from the zeolite tank means.

7. The system of claim 1 wherein the means to regenerate the zeolite material comprises a liquid cation solution to displace, the nitrogen contaminants from the zeolite material.

8. The system of claim 1 wherein the means to regenerate the zeolite material comprises a heating means to heat the zeolite material, to displace the nitrogen contaminant as a gaseous material.

9. The system of claim 8 which includes a capture means to capture the displaced gaseous material.

10. The system of claim 1 wherein the means to regenerate the zeolite material comprises bacteria introduced into the zeolite tank means.

11. The system of claim 1 wherein the zeolite tank means comprises a plurality of parallel zeolite tank means of zeblite material to provide one zeolite tank not in use, while the other zeolite tank is in use for decontaminating wastewater effluent.

12. The system of claim 1 which includes a means to adjust the pH of the clarified wastewater entering the zeolite tank means.

13. The system of claim 1 wherein the zeolite tank means is tilted to provide gravity flow of the clarified wastewater through the zeolite tank means.

14. The system of claim 1 wherein the means to regenerate includes a source of saltwater connected to the zeolite tank means.

15. The system of claim 1 wherein the secondary treatment means comprises a secondary treatment tank with an upper media bed, a sump, and a pump to cycle wastewater effluent to an upper portion of the media bed.

16. The system of claim 15 wherein the secondary treatment tank includes a fan to promote oxidation of the wastewater effluent.

17. The system of claim 1 wherein the zeolite tank means includes a clarified wastewater distribution means to distribute the clarified wastewater generally uniformly over an upper surface of the zeolite material.

18. The system of claim 17 wherein the zeolite tank means includes an upper layer of a coarse grain zeolite material and a lower layer of a finer grain zeolite material.

19. The system of claim 1 which includes an outflow pipe from a lower portion of the zeolite tank means to the leach field means.

20. The system of claim 1 which includes a sensor means to monitor the nitrogen contaminants.

21. The system of claim 20 wherein the sensor means comprises an ion sensor which measures the ammonium ion concentration.

22. The system of claim 20 wherein the means to regenerate comprises:
   a) a rock-salt source;
   b) a pump to pump clarified wastewater through the rock salt source and into the zeolite tank means for regeneration; and
   c) a control means to activate the pump when the sensor means detects a selected level of nitrogen contaminants in the decontaminated wastewater effluent.

23. The system of claim 22 wherein the sensor means comprises an ion sensor which measures the ammonium ion concentration.

24. The system of claim 23 wherein the control means is activated when the ammonium ion concentration is greater than about 20 ppm.

25. A septic system for the removal of nitrogen contaminants from septic wastewater effluent, which system comprises:
a) a source of wastewater containing nitrogen contaminants;
b) a septic tank connected to said source of wastewater to receive such wastewater and to provide a wastewater effluent from said septic tank;
c) a zeolite tank means to receive wastewater effluent from the septic tank and containing zeolite material selected to capture and retain the nitrogen contaminants in the wastewater effluent and to provide a decontaminated wastewater effluent;
d) a leach field means to receive the treated wastewater effluent from the zeolite tank means;
e) a means to regenerate periodically, the zeolite material in the zeolite tank means, when the zeolite material can no longer substantially capture the nitrogen contaminants; and
f) a sensor means to detect the concentration of nitrogen contaminants in the decontaminated wastewater effluent, which sensor means provides a signal when the contamination rises above a selected concentration to activate the regeneration of the zeolite bed.

26. The system of claim 25, which system includes a secondary treatment means to reduce suspended solids in the wastewater effluent and to lower biological oxygen demand (BOD).

27. The system of claim 26 wherein the secondary treatment means comprises a secondary treatment tank to receive wastewater effluent from the septic tank, and having an upper media bed and a pump to pump the wastewater effluent to an upper portion of the media bed, and to provide a clarified wastewater to the zeolite tank means.

28. The system of claim 25 which includes:
a) a rock salt source;
b) a pump to pump wastewater effluent through the rock salt source and into the zeolite tank means for regeneration; and
c) a control means to activate the pump when the sensor means detects a selected level of nitrogen contaminants in the decontaminated wastewater effluent.

29. The system of claim 25, which system includes:
a) a rock salt bed;
b) an ammonium saline-waste holding tank;
c) a means to direct wastewater effluent through the rock salt bed and into the zeolite tank means and to the holding tank to regenerate the zeolite material in the zeolite tank means.

30. The system of claim 29 which includes a pump to pump wastewater effluent through the zeolite tank means and control valves responsive to the sensor signal to direct the flow of wastewater effluent in the system.

31. The system of claim 25 wherein the sensor comprises an ion sensor at an inlet, an outlet, or both an inlet and outlet of the zeolite tank means.

32. A septic system for the removal of nitrogen contaminants from septic wastewater effluent, which system comprises:
a) a source of wastewater containing nitrogen contaminants;
b) a septic tank connected to said source of wastewater to receive such wastewater and to provide a wastewater effluent from said septic tank;
c) a zeolite tank means to receive wastewater effluent from the septic tank and containing zeolite material selected to capture and retain the nitrogen contaminants in the wastewater effluent and to provide a decontaminated wastewater effluent;
d) a leach field means to receive the treated wastewater effluent from the zeolite tank means; and
e) a means to regenerate periodically, the zeolite material in the zeolite tank means, when the zeolite material can no longer substantially capture the nitrogen contaminants, which means to regenerate includes:
i) a rock salt bed;
ii) an ammonium-saline waste holding tank to receive an ammonium-saline waste stream from the regeneration of the zeolite tank means; and
iii) a means to distribute wastewater effluent through the rock salt bed and into the zeolite tank means and to discharge an ammonium-saline waste stream into the holding tank.

33. A method for the removal of nitrogen contaminants from a wastewater-treated effluent from a septic system, which method comprises:
a) withdrawing a wastewater effluent containing nitrogen contaminants from a septic tank;
b) treating the wastewater effluent to reduce suspended solids and to lower the biological oxygen demand (BOD);
c) introducing the treated wastewater effluent into a zeolite tank, which zeolite tank contains zeolite material selected to capture and retain the nitrogen contaminants in the treated wastewater effluent;
d) capturing and retaining, in the zeolite material, the nitrogen contaminants until the zeolite material has been substantially exhausted, to provide a decontaminated wastewater effluent;
e) regenerating periodically, the zeolite material in the zeolite tank, by treating the zeolite material to displace the captured nitrogen contaminants from the zeolite material; and
f) distributing the decontaminated waste effluent from the zeolite tank into a leach field for soil percolation.

34. The method of claim 33 which includes placing the septic system in nonabsorptive soil.

35. The method of claim 33 which includes regenerating the zeolite material by flushing the zeolite tank with saltwater.

36. The method of claim 33 wherein the zeolite material is selected from the group consisting of: clinoptilolite; phillipsite; mordenite; erionite; and combination thereof.

37. The method of claim 33 which includes regenerating the zeolite material, by heating the zeolite material to displace the captured nitrogen contaminants.

38. The method of claim 33 which includes regenerating the zeolite material, by introducing nitrifying bacteria into the zeolite tank.

39. The method of claim 33 which includes adjusting the pH of wastewater effluent entering the zeolite tank.

40. The method of claim 33 which includes regenerating the zeolite material, by employing a liquid cation solution to displace the captured nitrogen contaminants.

41. The method of claim 33 which includes reducing suspended solids of the wastewater effluent stream to less than about 20 ppm, prior to introduction into the zeolite tank.

42. The method of claim 33, wherein said treating comprises passing the wastewater effluent over a media bed to filter the wastewater effluent and to reduce the biological oxygen demand (BOD) prior to introduction into the zeolite tank.

43. The method of claim 33 which includes sensing the concentration of the nitrogen contaminants and providing a sensing signal for activating the regeneration of the zeolite material.

44. The method of claim 33 which includes generally uniformly distributing the wastewater effluent over a top surface of the zeolite material.

45. The method of claim 33 which includes withdrawing the decontaminated wastewater effluent from a lower section of the zeolite tank.

46. The method of claim 33 which includes regenerating the zeolite material when the nitrogen contaminants in the decontaminated wastewater effluent exceeds about 20 ppm.

47. The method of claim 33 which includes detecting the concentration of ammonium ions in the decontaminated wastewater effluent as an indication of nitrogen contaminants.

48. A method for the removal of nitrogen contaminants from a wastewater treated effluent from a septic system, which method comprises:
   a) withdrawing a wastewater effluent from a septic tank;
   b) introducing the wastewater effluent into a zeolite tank, which zeolite tank contains zeolite material selected to capture and retain the nitrogen contaminants in the wastewater effluent;
   c) capturing and retaining, in the zeolite material, the nitrogen contaminants until the zeolite material has been substantially exhausted, to provide a decontaminated wastewater effluent;
   d) sensing the concentrations of the nitrogen contaminants and providing a sensing signal for regeneration of the zeolite material;
   e) regenerating periodically, the zeolite material in the zeolite tank by treating the zeolite material with a saline solution to displace the captured nitrogen contaminants from the zeolite material; and
   f) distributing the decontaminated waste effluent from the zeolite tank into a leach field for soil percolation.

49. The method of claim 48 which includes:
   a) flowing periodically, on regeneration, the wastewater effluent through a rock salt bed and through the zeolite tank, for a time period, to regenerate the zeolite material and to provide an ammonium-saline wastewater stream; and
   b) discharging the ammonium-saline waste stream into a holding tank for subsequent treatment or removal.

50. A system for the removal of nitrogen contaminants from wastewater effluent, which system comprises:
   a) a source of wastewater containing nitrogen contaminants;
   b) a septic tank connected to said source of wastewater to receive such wastewater and to provide a wastewater effluent;
   c) a means to receive the wastewater effluent, to reduce suspended solids in the wastewater effluent, and to lower biological oxygen demand (BOD) and discharge a clarified wastewater;
   d) a means to receive the clarified wastewater, and which means having zeolite material selected to capture and retain the nitrogen contaminants in the clarified wastewater and to provide a decontaminated wastewater effluent;
   e) a means to receive the decontaminated wastewater effluent from the zeolite material; and
   f) a means to regenerate periodically the zeolite material when the zeolite material can no longer substantially capture and retain the nitrogen contaminants.

51. A system for the removal of nitrogen contaminants from wastewater effluent, which system comprises:
   a) a source of wastewater containing nitrogen contaminants;
   b) a septic tank connected to said source of wastewater to receive such wastewater and to provide a wastewater effluent;
   c) a means to receive the wastewater effluent, and the means comprises zeolite material selected to capture and retain the nitrogen contaminants in the wastewater effluent and to provide a decontaminated wastewater effluent;
   d) a means to receive the treated wastewater effluent from the zeolite material;
   e) a means to regenerate periodically the zeolite material when the zeolite material can no longer substantially capture the nitrogen contaminants; and
   f) a means to sense the concentration of nitrogen contaminants in the decontaminated wastewater effluent, which means provides a signal when the contamination reaches a selected concentration, to give notice of the need for regeneration of the zeolite material.

* * * * *

UNITED STATES PATENT AND TRADEMARK OFFICE
CERTIFICATE OF CORRECTION

PATENT NO.   : 6,531,063 B1                                       Page 1 of 1
DATED        : March 11, 2003
INVENTOR(S)  : Jane Anne Rose It is certified that error appears in the above-identified patent and that said Letters Patent is hereby corrected as shown below:

<u>Column 9,</u>
Line 38, after "tank" delete "-".
Line 39, after "such" delete ".".
Line 48, after "and" delete ".".

<u>Column 10,</u>
Line 18, after "means of" delete "zeblite" and insert -- zeolote --.
Line 55, after "rock" delete "-".

Signed and Sealed this

Ninth Day of September, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,531,063 B1                                          Page 1 of 1
DATED         : March 11, 2003
INVENTOR(S)   : Jane Anne Rose It is certified that error appears in the above-identified patent and that said Letters Patent is hereby corrected as shown below:

Column 9,
Line 38, after "tank" delete "-".
Line 39, after "such" delete ".".
Line 48, after "and" delete ".".

Column 10,
Line 18, after "means of" delete "zeblite" and insert -- zeolite --.
Line 55, after "rock" delete "-".

This certificate supersedes Certificate of Correction issued September 9, 2003.

Signed and Sealed this

Twenty-fifth Day of November, 2003

JAMES E. ROGAN
*Director of the United States Patent and Trademark Office*